United States Patent
Tamaki et al.

(10) Patent No.: US 8,574,664 B2
(45) Date of Patent: Nov. 5, 2013

(54) ELECTROLYTE MEMBRANE, METHODS OF MANUFACTURE THEREOF AND ARTICLES COMPRISING THE SAME

(75) Inventors: Ryo Tamaki, Santa Clarita, CA (US); Steven Thomas Rice, Scotia, NY (US); Gary William Yeager, Rexford, NY (US)

(73) Assignee: General Electric Company, Niskayuna, NY (US)

( * ) Notice: Subject to any disclaimer, the term of this patent is extended or adjusted under 35 U.S.C. 154(b) by 1142 days.

(21) Appl. No.: 12/202,754

(22) Filed: Sep. 2, 2008

(65) Prior Publication Data

US 2010/0055534 A1  Mar. 4, 2010

(51) Int. Cl.
*B05D 5/12* (2006.01)

(52) U.S. Cl.
USPC ........................................... 427/115; 429/429

(58) Field of Classification Search
USPC ........................... 427/115; 429/479, 795, 429
See application file for complete search history.

(56) References Cited

U.S. PATENT DOCUMENTS

| 6,635,384 | B2 | 10/2003 | Bahar et al. | |
|---|---|---|---|---|
| 7,258,941 | B2 | 8/2007 | Hirano et al. | |
| 2003/0211264 | A1 | 11/2003 | Farnsworth et al. | |
| 2004/0214064 | A1* | 10/2004 | Cavalca et al. | 429/33 |
| 2006/0160960 | A1 | 7/2006 | Chang et al. | |
| 2006/0180796 | A1* | 8/2006 | Adachi et al. | 252/500 |
| 2006/0223895 | A1* | 10/2006 | Yoshida et al. | 521/27 |
| 2006/0275637 | A1 | 12/2006 | Nakazawa et al. | |
| 2007/0082247 | A1* | 4/2007 | Lee et al. | 429/33 |
| 2007/0100131 | A1 | 5/2007 | Hung et al. | |
| 2007/0122676 | A1* | 5/2007 | Song | 429/33 |
| 2007/0142614 | A1 | 6/2007 | Hung et al. | |
| 2008/0199756 | A1* | 8/2008 | Takahashi et al. | 429/33 |

FOREIGN PATENT DOCUMENTS

WO    2008009102    1/2008

* cited by examiner

*Primary Examiner* — Michael Cleveland
*Assistant Examiner* — Tabassom Tadayyon Eslami
(74) *Attorney, Agent, or Firm* — Ann M. Agosti

(57) ABSTRACT

Disclosed herein is a method of forming an electrolyte membrane comprising forming a mixture; the mixture comprising a polyhydroxy compound, an aromatic polyhalide compound and an alkali metal hydroxide; disposing the mixture on a porous substrate; reacting the mixture to form a crosslinked proton conductor; and sulfonating the proton conductor. Disclosed herein too is an article comprising a porous substrate; and a sulfonated crosslinked proton conductor disposed within pores of the porous substrate.

22 Claims, No Drawings

ELECTROLYTE MEMBRANE, METHODS OF MANUFACTURE THEREOF AND ARTICLES COMPRISING THE SAME

FEDERAL RESEARCH STATEMENT

This invention was made with Government support from the U.S. Department of Energy under Contract No. DE-FG36-06GO16034. The Government has certain rights in the invention.

BACKGROUND

This disclosure relates to an electrolyte membrane, methods of manufacture thereof and articles comprising the same. In particular, this disclosure relates to an electrolyte membrane that can be used in a fuel cell.

The interest in fuel cells, as a clean, alternative power source, has motivated intense research in the area of fuel cell development. In particular, proton exchange membrane (PEM) fuel cells are currently in development for use in transport as well as stationery and portable applications. One of the challenges lie in meeting commercial performance targets for both automotive and portable applications, as well as decreasing the cost associated with the production of PEM fuel cells.

Currently, commercially available fuel cells use Nafion® or other perfluorosulfonic acid polymer membranes as a polymer electrolyte. These materials possess good proton conductivity as well as good chemical and mechanical stability under humid conditions encountered in a fuel cell. However, the widespread use of these membranes has been limited by cost and long-term performance. One of the primary challenges impairing the achievement of long-term PEM performance is improvement of the mechanical strength and thermal stability of the membranes.

When the membranes are exposed to cycles characterized by excessively humid or dry conditions, commercially available membranes experience significant dimensional changes, particularly if they are prone to swelling or shrinking. These dimensional changes often result in the structural failure of the membrane, resulting in the development of cracks, tears or other deformations of the membrane. These structural failures can lead to premature failure of the fuel cell.

Accordingly, therefore there is a need for a proton exchange membrane with improved mechanical and thermal stability.

SUMMARY

Disclosed herein is a method of forming an electrolyte membrane comprising forming a mixture; the mixture comprising a polyhydroxy compound, an aromatic polyhalide compound and an alkali metal hydroxide; disposing the mixture on a porous substrate; reacting the mixture to form a crosslinked proton conductor; and sulfonating the proton conductor.

Disclosed herein too is a method comprising deprotonating a tris(hydroxyphenyl)ethane to produce a deprotonated tris(hydroxyphenyl)ethane; reacting the deprotonated tris(hydroxyphenyl)ethane with sulfonated difluorodiphenylsulfone in the pores of a porous substrate to produce cross-linked polyethersulfone as shown in the reaction (I)

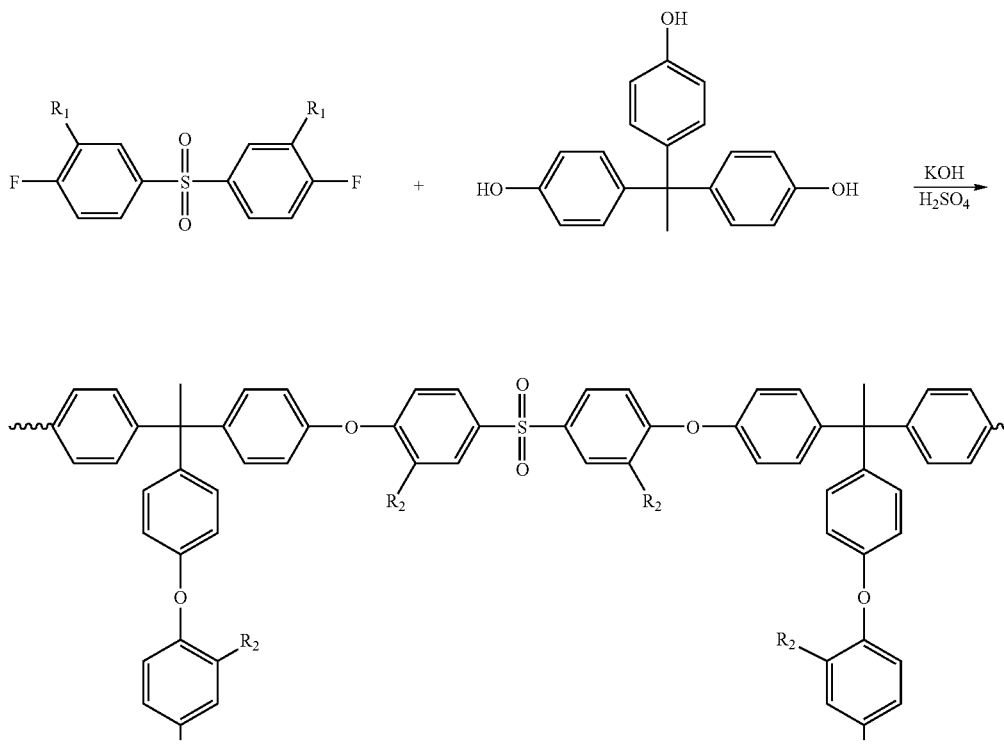

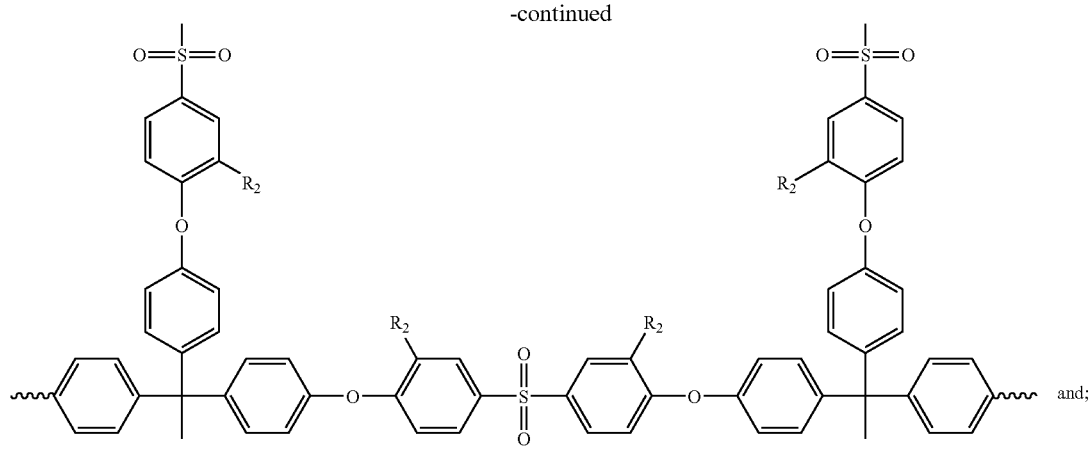
sulfonating the crosslinked polyethersulfone as shown in the reaction (II)
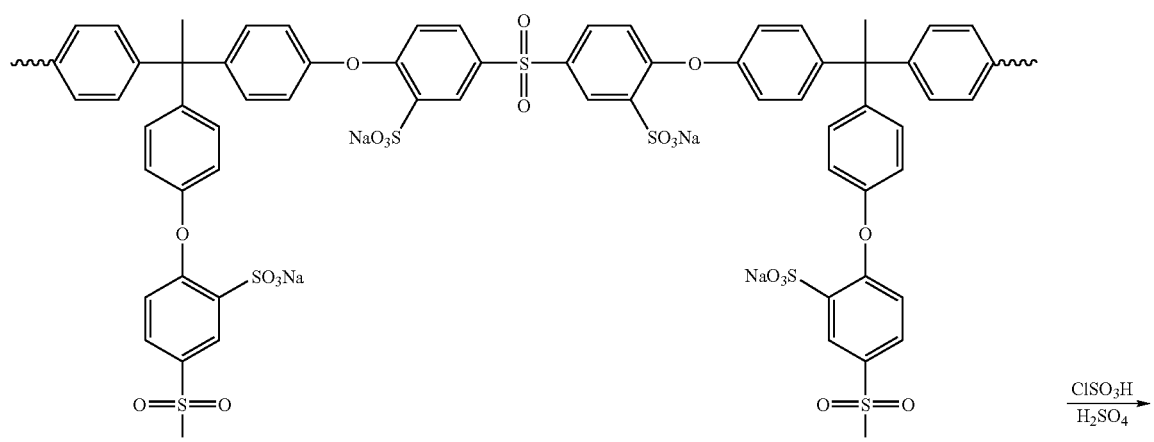
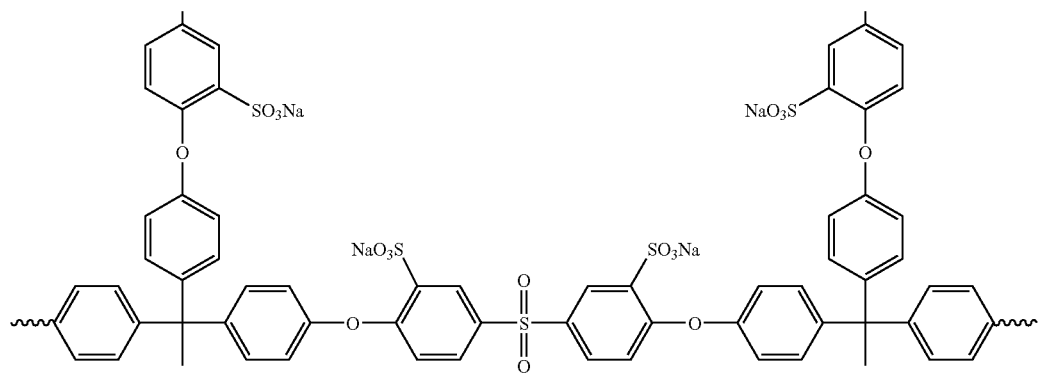

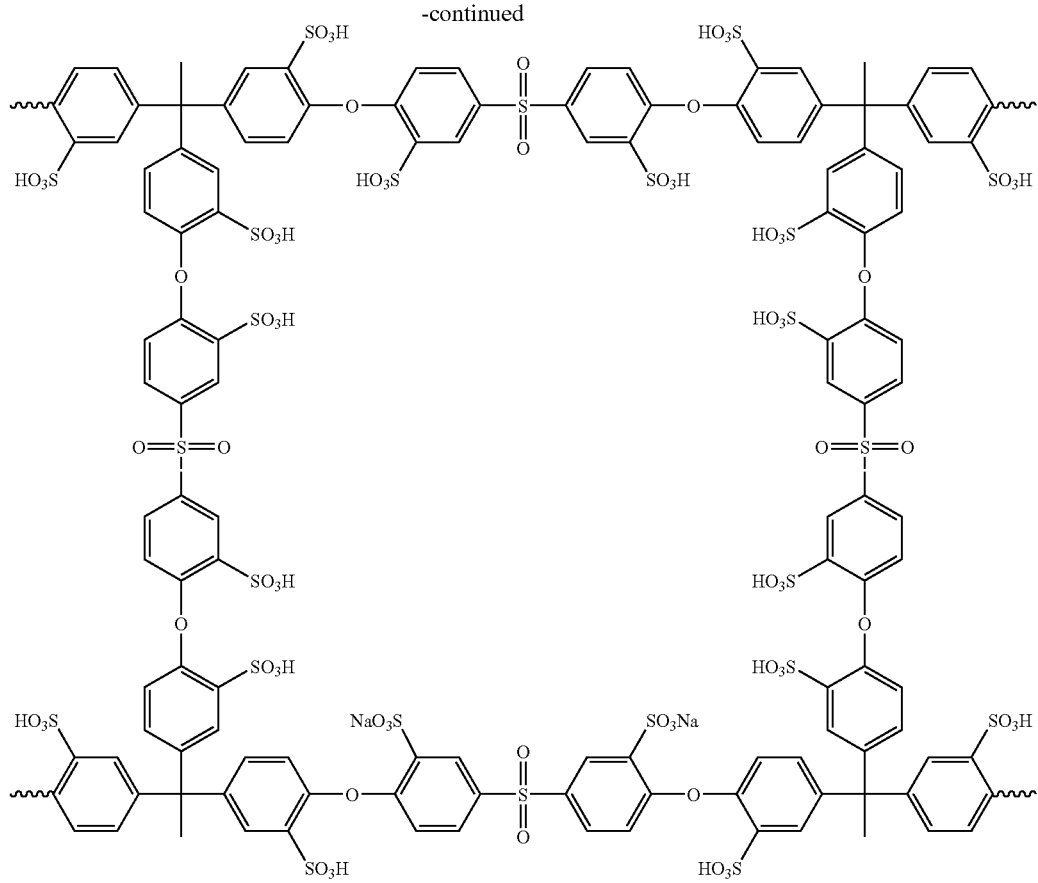

to produce a sulfonated crosslinked polyethersulfone in the pores of the porous substrate.

Disclosed herein too is a method of forming an electrolyte membrane comprising forming a first mixture, the mixture comprising a first solvent, an alkali metal hydroxide and a compound of formula (V):

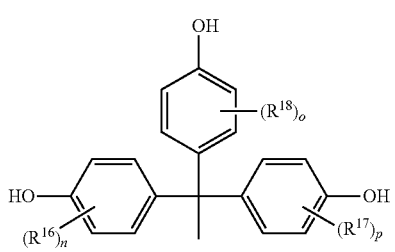

where $R^{16}$, $R^{17}$ and $R^{18}$ are each a hydrogen atom, a halogen atom, a $C_{1-10}$ alkyl group, a halogen-substituted $C_{1-10}$ alkyl group, a $C_{6-10}$ aryl group, or a halogen-substituted $C_{6-10}$ aryl group, and n, o and p are each independently integers of 1 to about 4; adding to the first mixture a compound of formula (VI):

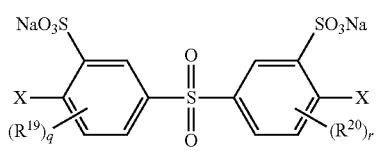

(VI) where X is a halogen and $R^{19}$ and $R^{20}$ are each independently a hydrogen atom, a halogen atom, a $C_{1-10}$ alkyl group, a halogen-substituted $C_{1-10}$ alkyl group, a $C_{6-10}$ aryl group, or a halogen-substituted $C_{6-10}$ aryl group, and q and r are each independently integers of 1 to 3; adding to the first mixture a second solvent to form a second mixture, wherein the second solvent comprises isopropanol and dimethylsulfoxide; disposing the second mixture on a porous substrate, the porous substrate comprising expanded polytetrafluoroethylene; reacting the second mixture to form a crosslinked proton conductor integrated with the porous substrate to form an electrolyte membrane; and sulfonating the crosslinked proton conductor with a sulfonating agent for form a sulfonated crosslinked proton conductor.

Disclosed herein too is an article comprising a porous substrate; and a sulfonated crosslinked proton conductor disposed within pores of the porous substrate.

These and other features, aspects, and advantages of the disclosed embodiments will become better understood with reference to the following description and appended claims.

DETAILED DESCRIPTION

The terms "the", "a" and "an" do not denote a limitation of quantity, but rather denote the presence of at least one of the referenced item. The suffix "(s)" as used herein is intended to include both the singular and the plural of the term that it modifies, thereby including at least one of that term (e.g., the colorant(s) includes at least one colorants). Unless defined otherwise, technical and scientific terms used herein have the same meaning as is commonly understood by one of skill in the art. As used herein, the terms "first," "second." and the like do not denote any order or importance, but rather are used to distinguish one element from another.

As used herein, approximating language can be applied to modify any quantitative representation that can vary without resulting in a change in the basic function to which it is related. Accordingly, a value modified by a term or terms, such as "about" and "substantially," cannot to be limited to the precise value specified, in some cases. In at least some instances, the approximating language can correspond to the precision of an instrument for measuring the value. Thus the modifier "about" used in connection with a quantity is inclusive of the stated value and has the meaning dictated by the context (e.g., includes the degree of error associated with measurement of the particular quantity).

The notation "±10%" means that the indicated measurement can be from an amount that is minus 10% to an amount that is plus 10% of the stated value. Furthermore, all ranges disclosed herein are inclusive of the endpoints and are independently combinable. The endpoints of all ranges directed to the same component or property are inclusive and independently combinable (e.g., ranges of "less than or equal to about 25 wt %, or, more specifically, about 5 wt % to about 20 wt %," is inclusive of the endpoints and all intermediate values of the ranges of "about 5 wt % to about 25 wt %," etc.).

"Optional" or "optionally" means that the subsequently described event or circumstance can or can not occur, and that the description includes instances where the event occurs and instances where it does not. All cited patents, patent applications, and other references are incorporated herein by reference in their entirety As used herein, "substrate" or "substrates" can be used interchangeably with "surface" or "surfaces."

Disclosed herein is a method of producing an electrolyte membrane. The method comprises disposing a crosslinked proton conductor on a porous substrate and sulfonating the crosslinked proton conductor. In an exemplary embodiment, the proton conductor can be a polyethersulfone derived from the reaction of a tris(hydroxyphenyl)ethane with a sulfonated dihalophenylsulfone. Following the reaction, the proton conductor is then subjected to post-sulfonation. By disposing the proton conductor on a porous substrate, the proton conductor can be formed within and between the pores of the porous substrate to form the electrolyte membrane. The post sulfonation can thus occur in the pores of the electrolyte membrane. In an exemplary embodiment, the porous substrate is expanded polytetrafluoroethylene (ePTFE).

The use of the crosslinked proton conductor suppresses water solubility. This increases the dimensional stability of the electrolyte membrane. Crosslinking also prevents the dissolution of electrolytes.

The porous substrate can comprise an organic polymer. Porous supports include polymers derived from aliphatic or aromatic hydrocarbons. The polymers useful in the generation of porous supports include polysulfones, polyethersulfones, polybenzonitriles, polyamidesulfones, polyamidebenzonitriles, polythioethersulfones, polybenzimidazoles, polyimides, polyamideimides, polyetherimides, polyphenylenes, polyarylene ethers, polyacrylonitriles, polysaccharides, cellulose and cellulosic esters and ethers, polyolefins, polyamides, polycarbonates, cellulosic polymers, polyurethanes, polyesters, polyethers, polyacrylates, copolyether esters, copolyether amides, fluoropolymers, or the like, or a combination comprising at least one of the foregoing organic polymers.

An exemplary polymer is a fluoropolymer. Examples of suitable fluoropolymers are polytetrafluoroethylene, poly(vinylidene fluoride), poly(vinylidene fluoride co-hexafluoropropylene), poly(tetrafluoroethylene oxide-co-difluoromethylene oxide, poly(tetrafluoroethylene-co-perfluoro (propylvinyl ether)), or the like, or a combination comprising at least one of the foregoing fluoropolymers.

An exemplary fluoropolymer is porous polytetrafluoroethylene, specifically a membrane of expanded porous PTFE (sometimes referred to as ePTFE). The porous polytetrafluoroethylene is generally used in the form of a sheet.

Porous polytetrafluoroethylene sheet can be made by commercial processes, for example, by stretching or drawing processes, by papermaking processes, by processes in which filler materials are incorporated with the PTFE resin that are subsequently removed to leave a porous structure, or by a powder sintering processes. In one embodiment, the porous polytetrafluoroethylene sheet can be a porous expanded polytetrafluoroethylene sheet having a structure of interconnected nodes and fibrils. The nodes and fibrils can define an internal structure having a three-dimensional network of interconnected passages and pathways that extend vertically, from surface to surface, and laterally, from edge to edge, throughout the membrane.

The porous substrate can have a thickness of about 3 to about 1,000 micrometers, specifically about 5 to about 500 micrometers, and more specifically about 10 to about 200 micrometers. The porous substrate can have a porosity of about 20 to about 98 volume percent, specifically about 30 to about 95 volume percent, and more specifically about 50 to about 90 volume percent, based on the total volume of the porous substrate. In addition, the porous substrate can have an average pore size of about 0.01 to about 20 micrometers, specifically about 0.05 to about 15 micrometers, and more specifically about 0.1 to about 10 micrometers. The thickness of the porous substrate can be about 10 to about 500 micrometers, specifically about 20 to about 150 micrometers, and more specifically about 25 to about 50 micrometers.

A porous substrate that comprises expanded porous PTFE is commercially available from General Electric Corporation under the trademark QM702.

As noted above, the proton conductor is disposed on the porous substrate to form the electrolyte membrane. The proton conductor is a polymer having aromatic groups on its backbone. Aromatic groups provide thermal resistance, oxidation resistance, flexibility, and membrane formability. The proton conductor also comprises proton acid groups that can readily exchange protons.

In an exemplary embodiment, the proton conductor is a protonic acid containing aromatic polymer. Examples of suitable protonic acid containing aromatic polymers are protonic acid containing aromatic polyethers, polyetherketones, polyarylethers, polyphenylene ethers, polybenzimidazoles, polyethersulfones, polysulfones, polybenzoxazoles, polybenzothiazoles, polythiazoles, polyphenylquinoxalines, polypyridines, polypyrimidines, polyoxathiazoles, polytetrazapyzarenes, polyvinylpyridines, polyvinylimidazoles, polypyrrolidones, or the like, or a combination comprising at least one of the foregoing protonic acid containing aromatic polymers.

In another embodiment, a sulfonated derivative of a protonic acid containing polyetherketone, polyarylene ether, polyphenylene ether, polybenzimidazole, polyethersulfone, polysulfone, polybenzoxazole, polybenzothiazole, polythiazole, polyphenylquinoxaline, polypyridine, polypyrimidine, polyoxathiazole, polytetrazapyzarene, polyvinylpyridine, polyvinylimidazole, polypyrrolidone or the like, or a combination comprising at least one of the foregoing sulfonated derivative of a protonic acid containing polymers may be disposed upon the porous substrate. An exemplary proton conductor is a polyethersulfone that is reacted with a protonic acid.

An aromatic polymer for use as the proton conductor can be produced by the reaction of a polyhydroxy or polymercapto compound with an aromatic polyhalide compound. A suitable polyhydroxy or polymercapto compound has a structure shown in Formula (I) below:

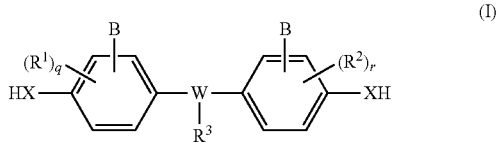

(I)

wherein B is a hydrogen, alkyl, aryl or a protonic acid containing group such as a sulfonate group (—SO$_3$H), a carboxylate group (—COOH), a phosphate group (—PO$_3$H$_2$), an alkylsulfonate group —(R$^4$)$_n$SO$_3$H), a sulfamoylsulfonylalkyl group or a sulfamoylsulfonylaryl group ((—SO$_2$NHSO$_2$R), wherein R is alkyl or aryl), a perfloruoalkylsulfonate group (CF$_2$)$_n$SO$_3$H), a sulfonylalkylsulfonate group (SO$_2$(R$^4$)$_n$SO$_3$H), a sulfonylperfluoroalkylsulfonate group (SO$_2$(CF$_2$)SO$_3$H), a sulfamoylsulfonylalkylsulfonate (SO$_2$NHSO$_2$(R$^4$)$_n$SO$_3$H), sulfamoylsulfonylperfluoroalkylsulfonate group (SO$_2$NHSO$_2$(CF$_2$)$_n$SO$_3$H), an alkylcarboxylate group (—(R$^4$)$_n$COOH), a perfluoroalkylcarboxylate group (CF$_2$)$_n$CO$_2$H, an alkylphosphonate group (—(R$^4$)$_n$PO$_3$H$_2$), an perfluoroalkylphoshonate group, or their respective conjugated salts; the conjugated salt having a metal cation from Group I of the periodic table. R$^1$ and R$^2$ are each independently a hydrogen atom, a halogen atom, a C$_{1-10}$ alkyl group, a halogen-substituted C$_{1-10}$ alkyl group or a C$_{6-50}$ aryl group. q and r are independently integers from 1 to about 4. In the Formula (I) above, R$_3$ can be a hydrogen atom, a halogen atom, a C$_{1-10}$ alkyl group, a halogen-substituted C$_{1-10}$ alkyl group, a C$_{6-50}$ aryl group, or a halogen-substituted C$_{6-50}$ aryl group, while R$^4$ is an alkyl, aryl or perfluoroalkyl group. W is selected from the group consisting of

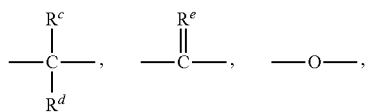

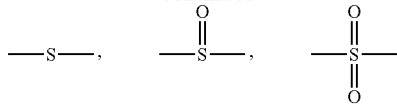

—SO$_2$NHSO$_2$—, and —SO$_2$(CF$_2$)$_n$SO$_2$— or

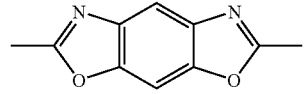

wherein R$^c$ and R$^d$ each independently represent a hydrogen atom or a monovalent linear or cyclic hydrocarbon group, and R$^e$ is a divalent hydrocarbon group, oxygen, or sulfur. In the Formula (I) above, X is O, S, or SO$_2$.

An exemplary polyhydroxy compound has a structure shown in Formula (II) below:

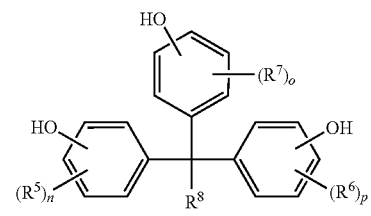

(II)

where R$^5$, R$^6$, R$^7$ and R$^8$ are each independently a hydrogen atom, a halogen atom, a C$_{1-10}$ alkyl group, a halogen-substituted C$_{1-10}$ alkyl group, a C$_{6-50}$ aryl group, or a halogen-substituted C$_{6-50}$ aryl group, and n, o and p are each independently integers of 1 to about 4. In one embodiment, R$^5$, R$^6$, R$_7$ and R$^8$ are each independently a hydrogen atom or a halogen atom and n, o and p are each independently integers of 1 to about 4. In another embodiment, R$^5$, R$^6$, R$^7$ and R$^8$ are each a halogen atom and n, o and p are each independently integers of 1 to about 4. In an exemplary embodiment, R$^5$, R$^6$, R$^7$ and R$^8$ are each a hydrogen atom.

The aromatic polyhalide can have the structure shown in Formula (III) below:

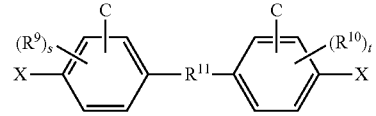

where X is a halogen and R$^9$ and R$^{10}$ are each independently a hydrogen atom, a halogen atom, a C$_{1-10}$ alkyl group, a halogen-substituted C$_{1-10}$ alkyl group, a C$_{6-10}$ aryl group, or a halogen-substituted C$_{6-10}$ aryl group, and s and t are each independently integers of 1 to 4. R$^{11}$ represents one of the following groups

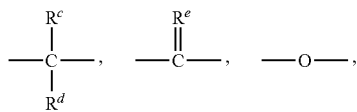

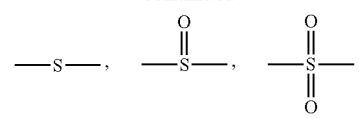

—SO$_2$NHSO$_2$—, —SO$_2$(CF$_2$)$_n$SO$_2$— or

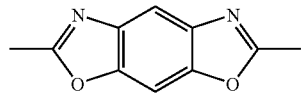

and C is a protonic acid containing group such as a sulfonate group (—SO$_3$H), a carboxylate group (—COOH), a phosphate group (—PO$_3$H$_2$), an alkylsulfonate group (—(R$^{12}$)$_n$SO$_3$H), a sulfamoylsulfonylalkyl or sulfamoylsulfonylaryl group (—SO$_2$NHSO$_2$R, wherein R is alkyl or aryl), a perfloruoalkylsulfonate group (CF$_2$)$_n$SO$_3$H), a sulfonylalkylsulfonate group (SO$_2$(R$^{12}$)$_n$SO$_3$H), a sulfonylperfluoroalkylsulfonate group (SO$_2$(CF$_2$)SO$_3$H), a sulfamoylsulfonylalkylsulfonate group (SO$_2$NHSO$_2$(R$^{12}$)$_n$SO$_3$H), a sulfamoylsulfonylperfluoroalkylsulfonate group (SO$_2$NHSO$_2$(CF$_2$)$_n$SO$_3$H), an alkylcarboxylate group (—(R$^{12}$)$_n$COOH), a perfluoroalkylcarboxylate group (CF$_2$)$_n$CO$_2$H, an alkylphosphonate group (—(R$^{12}$)$_n$PO$_3$H$_2$) an perfluoroalkylphoshonate group or their conjugated salts; the conjugated salts having a metal cation from Group I of the periodic table. R$^{12}$ can be an alkyl, aryl or perfluoroalkyl group.

In an exemplary embodiment, the aromatic dihalide compound can have the structure shown in Formula (IV) below:

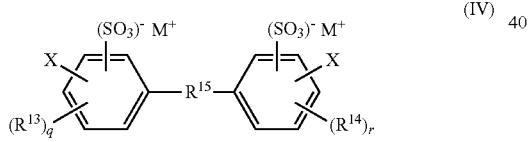

where X is a halogen, R$^{13}$ and R$^{14}$ are each independently a hydrogen atom, a halogen atom, a C$_{1-10}$ alkyl group, a halogen-substituted C$_{1-10}$ alkyl group, a C$_{6-10}$ aryl group, or a halogen-substituted C$_{6-10}$ aryl group, and q and r are each independently integers of 1 to 3. R$^{15}$ represents one of the following groups:

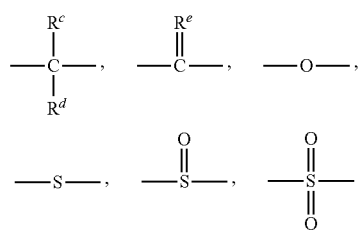

—SO$_2$NHSO$_2$—, —SO$_2$(CF$_2$)$_n$SO$_2$— or

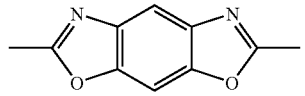

wherein R$^c$ and R$^d$ each independently represent a hydrogen atom or a monovalent linear or cyclic hydrocarbon group, and R$^e$ is a divalent hydrocarbon group, oxygen, or sulfur. M represents a metal cation from Group I of the periodic table. In an exemplary embodiment, M is sodium or potassium. In an exemplary embodiment, the aromatic dihalide is an aromatic sulfonated dihalide.

With reference to the formula (IV), in an exemplary embodiment, R$^{13}$ and R$^{14}$ are each independently a hydrogen atom or a halogen atom, M is sodium, X is fluorine, and q and r are each independently integers of 1 to 3.

In one embodiment, the crosslinked polyethersulfone is produced by reacting a trishydroxy compound having the Formula (V) with an aromatic dihalide compound having the Formula (VI).

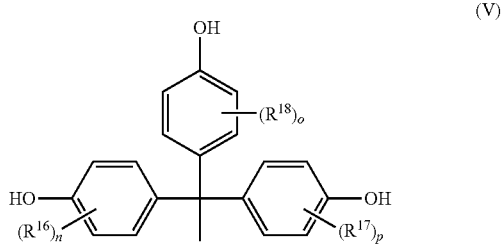

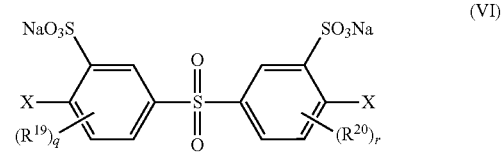

In the Formula (V) above, R$^{16}$, R$^{17}$ and R$^{18}$ are each a hydrogen atom, a halogen atom, a C$_{1-10}$ alkyl group, a halogen-substituted C$_{1-10}$ alkyl group, a C$_{6-10}$ aryl group, or a halogen-substituted C$_{6-10}$ aryl group, and n, o and p are each independently integers of 1 to about 4. In another embodiment, R$^{16}$, R$^{17}$ and R$^{18}$ are each independently a hydrogen atom.

In the Formula (VI) above, X is a halogen and R$^{19}$ and R$^{20}$ are each independently a hydrogen atom, a halogen atom, a C$_{1-10}$ alkyl group, a halogen-substituted C$_{1-10}$ alkyl group, a C$_{6-10}$ aryl group, or a halogen-substituted C$_{6-10}$ aryl group, and q and r are each independently integers of 1 to 3.

In an exemplary embodiment, the compound of Formula (V) is tris(hydroxyphenyl)ethane, while the compound of Formula (VI) is sulfonated difluorodiphenylsulfone. In one embodiment, the proton conductor is obtained by deprotonating the tris(hydroxyphenyl)ethane initially in methanol with a base catalyst. Methanol is then removed by distillation and the deprotonated tris(hydroxyphenyl)ethane is dissolved in water. To the aqueous solution is added the sulfonated difluorosulfone compound. The sulfonated difluorosulfone compound is dissolved into the aqueous solution at room temperature. Titanium tetraisopropoxide (TIP) in isopropanol (IPA) could be added to increase water retention. The obtained solution was coated on ePTFE and the monomers are cured in-situ, resulting in the cross-linked polyethersulfone in pores of ePTFE. The film is then soaked in chlorosulfonic acid solution to add more sulfonic acid groups.

Details of the reaction between the compound of formula (V) and the compound of formula (VI) to produce cross-linked polyethersulfone and the consequent manufacturing of the electrolyte membrane will now be provided below. The exemplary reaction between the tris(hydroxyphenyl)ethane (compound of formula (V)) and sulfonated difluorodiphenyl-sulfone (compound of formula (VI)) to produce cross-linked polyethersulfone is shown in the reaction (I) below.

about 1:1.8. In an exemplary embodiment, the molar ratio of the compound of formula (V) to the compound of formula (VI) is about 1:1.5.

As noted above, the deprotonation of the compound of formula (V) is conducted with an alkali metal hydroxide. Examples of suitable alkali metal hydroxides are lithium hydroxide, sodium hydroxide, potassium hydroxide, rubidium hydroxide, cesium hydroxide, or the like, or a combination comprising at least one of the foregoing alkali metal

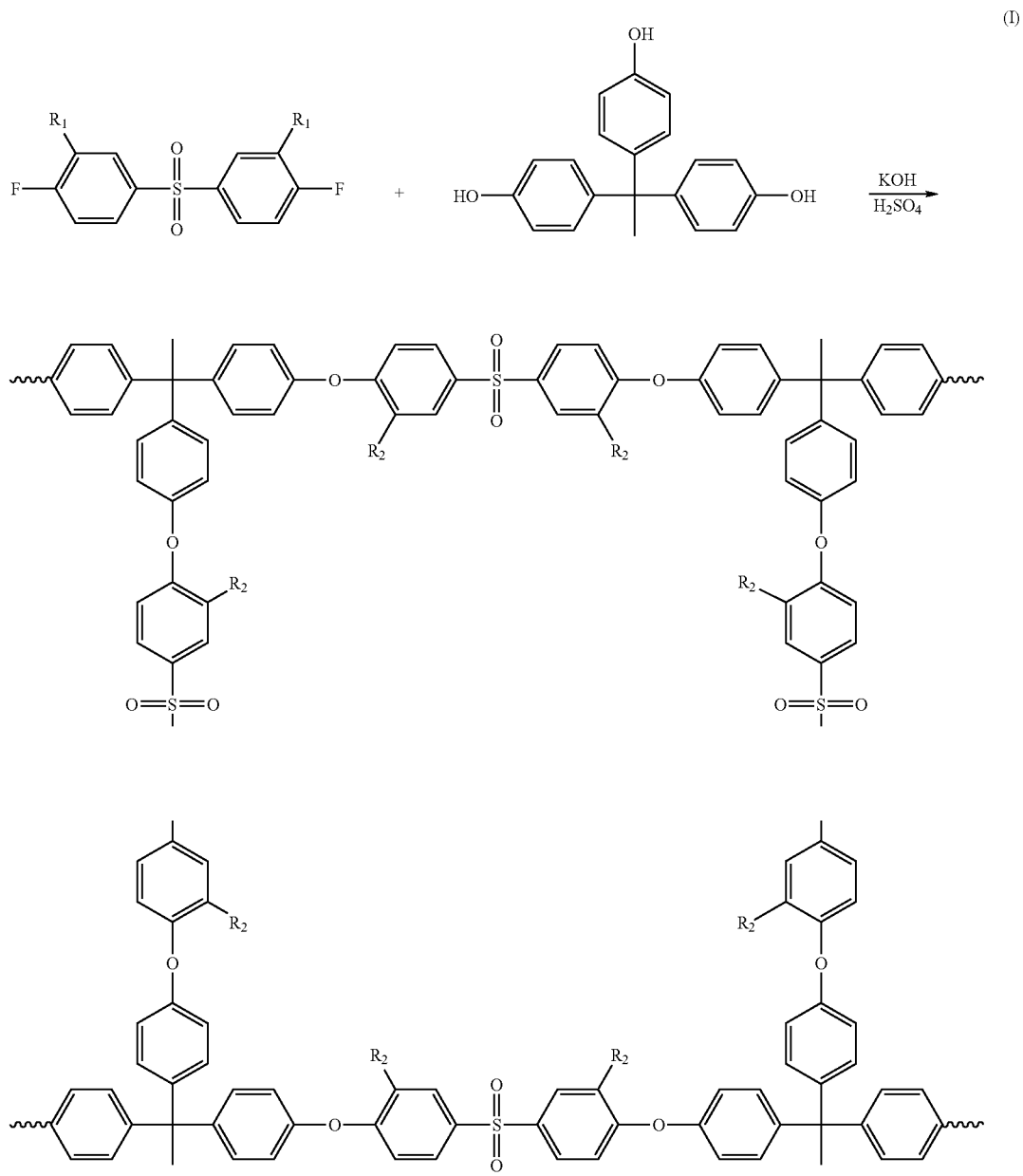

(I)

In the reaction (I) above, $R_1$=$SO_3Na$ and $R_2$=$SO_3H$. The molar ratio of the compound of formula (V) to the compound of formula (VI) can be about 1:1 to about 1:10, specifically about 1:1.1 to about 1:2, and more specifically about 1:1.3 to hydroxides. In an exemplary embodiment, the alkali metal hydroxide is potassium hydroxide.

In one embodiment, the compound of formula (V) can first be heated with the alkali metal hydroxide to form a reaction mixture that comprises the deprotonated compound of formula (VI). The mixture is heated to reflux. The compound of formula (VI) is then added to the reaction mixture.

The molar ratio of the compound of formula (V) to the alkali metal hydroxide can be about 1:1 to about 1:10, specifically about 1:1.1 to about 1:7, and more specifically about 1:2 to about 1:5. In an exemplary embodiment, the molar ratio of the compound of formula (V) to the alkali metal hydroxide is 1:3.

The reaction between the compound of formula (V) and the compound of formula (VI) can be conducted in the presence of a suitable solvent. The solvent can comprise a first solvent and a second solvent. In one embodiment, the compound of formula (V) and the alkali metal hydroxide can be heated with a first solvent prior to addition of the compound of formula (VI). After heating, the first solvent can be removed prior to the addition of the compound of formula (VI).

The first solvent can be a hydrophilic organic solvent. The first solvent can comprise an alcohol, amide, ketone, nitrile, sulfoxide, sulfone, thiophene, ester, amide, or the like, or a combination comprising at least one of the foregoing solvents. The first solvent is methanol, ethanol, propanol, isopropanol, butanolglycerol, ethylene glycol, diethylene glycol, triethylene glycol, N-methylpyrollidinone, N,N-dimethylformamide, N,N-dimethylacetamide, acetone, methyl ethyl ketone, acetonitrile, dimethylsulfoxide, diethyl sulfone, tetrahydrothiophene 1,1-dioxide, or the like, or a combination comprising at least one of the foregoing solvents. In an exemplary embodiment, the first solvent is methanol.

The second solvent can be a polar solvent. The second solvent can comprise an alcohol, water, liquid carbon dioxide, a ketone; a nitrile, a sulfoxide, a sulfone, a thiophene, an acetate, an amide, or the like, or a combination comprising at least one of the foregoing solvents. The second solvent is isopropyl alcohol, dimethylsulfoxide, or the like, or a combination comprising at least one of the foregoing solvents. In an exemplary embodiment, the second solvent is a combination of water and dimethylsulfoxide.

While not being bound by theory, the second solvent facilitates wetting of the porous substrate by the monomer mixture, the monomer mixture comprising the monomers used to form the crosslinked polyethersulfone. Thus it is believed that the monomers substantially fills all of the pores of the porous support and, upon polymerization of the monomers, which is believed to occur within the porous substrate, forms a polyethersulfone polymer, which is cross-linked, thus forming a proton-conducting network that is integrated with the porous support. In one embodiment, surfactants can also be used to facilitate the spreading of the monomer mixture on the surface of the porous substrate.

In one embodiment, a metal alkoxide such as for example titanium isopropoxide, zirconium isopropoxide, tetraethylorthosilicate, tetramethylorthosilicate, and the like can be added to the reaction mixture to improve mechanical stability and to facilitate the management of electrical conductivity.

Following the addition of the compound of formula (VI) and the second solvent to the reaction mixture, the mixture is heated to a suitable temperature overnight. In an exemplary embodiment, the reaction mixture is heated to a temperature of about 70 to about 90° C. for a period of about 3 to about 10 hours. The reaction mixture, which comprises monomers, is then disposed on both sides of the porous substrate. The monomers penetrate the pores of the porous substrate. The porous substrate is then heated to a temperature that is effective to promote crosslinking of the monomers to form the proton conductor (crosslinked polyethersulfone).

The disposing of the reaction mixture on the substrate may be conducted by spray painting, spin coating, dipping, roll coating (coating using nip rolls), and the like. In one embodiment, the electrolyte membrane comprises about 0.5 weight percent to about 50 wt % proton conductor, specifically about 5 to about 40 wt % proton conductor and more specifically about 10 to about 30 wt % proton conductor, based on the total weight of the electrolyte membrane.

In one embodiment, the porous substrate with the monomers disposed thereon is heated to a first temperature of about 120 to about 175° C. followed by heating to a second temperature of about 220 to about 300° C. The heating is conducted to facilitate the crosslinking of the polymer. In another embodiment, the porous substrate with the monomers disposed thereon is heated to a first temperature of about 140 to about 160° C. followed by heating to a second temperature of about 240 to about 360° C. The porous substrate is heated to the first temperature for a period of about 0.5 to about 4 hours and the second temperature for a period of about 0.5 to about 4 hours. Both the heating at the first temperature and the heating at the second temperature are conducted in an inert atmosphere.

Following the crosslinking of the polymer, the porous substrate with the crosslinked polymer disposed thereon is subjected to post sulfonation. The post sulfonation is conducted in is conducted to increase the acid density and the proton conductivity. The ion exchange capacity is increased with the post sulfonation. The post sulfonation is generally conducted by immersing the porous substrate with the crosslinked proton conductor disposed thereon in a sulfonating agent. Exemplary sulfonating agents that can be used to introduce sulfonate groups include concentrated sulfuric acid, fuming sulfuric acid, chlorosulfuric acid, a sulfuric anhydride complex, or the like, or a combination comprising at least one of the foregoing sulfonating agents.

Examples of suitable protonic acids are those that contain proton acid groups such as, for example, a sulfonate group ($-SO_3H$), a carboxylate group ($-COOH$), a phosphate group ($-PO_3H_2$), an alkylsulfonate group ($-(R^{15})_nSO_3H$), a sulfamoylsulfonylalkyl or sulfamoylsulfonylaryl group ($-SO_2NHSO_2R$, wherein R is alkyl or aryl), perfloruoalkylsulfonate ($(CF_2)_nSO_3H$), a sulfonylalkylsulfonate group ($SO_2(R^{15})_nSO_3H$), a sulfonylperfluoroalkylsulfonate group ($SO_2(CF_2)SO_3H$), a sulfamoylsulfonylalkylsulfonate group ($SO_2NHSO_2(R^{15})_nSO_3H$), a sulfamoylsulfonylperfluoroalkylsulfonate group ($SO_2NHSO_2(CF_2)_nSO_3H$), an alkylcarboxylate group ($-(CH_2)_nCOOH$), a perfluoroalkylcarboxylate group ($(CF_2)_nCO_2H$, an alkylphosphonate group ($-(R^{15})_n PO_3H_2$), a perfluoroalkylphoshonate group, a phenolic hydroxyl group (-Ph-OH), or the like, or a combination comprising at least one of the foregoing protonic acid groups. $R^{15}$ represents an alkyl, an aryl or perfluoroalkyl groups.

In the aforementioned alkylsulfonate group, the alkylcarboxylate group and the alkylphosphate group, n can be about 1 to about 10. In an exemplary embodiment, the porous substrate is immersed in chlorosulfonic acid to facilitate the sulfonation. The post sulfonation of the polyethersulfone by the chlorosulfonic acid is shown below in the reaction (II).

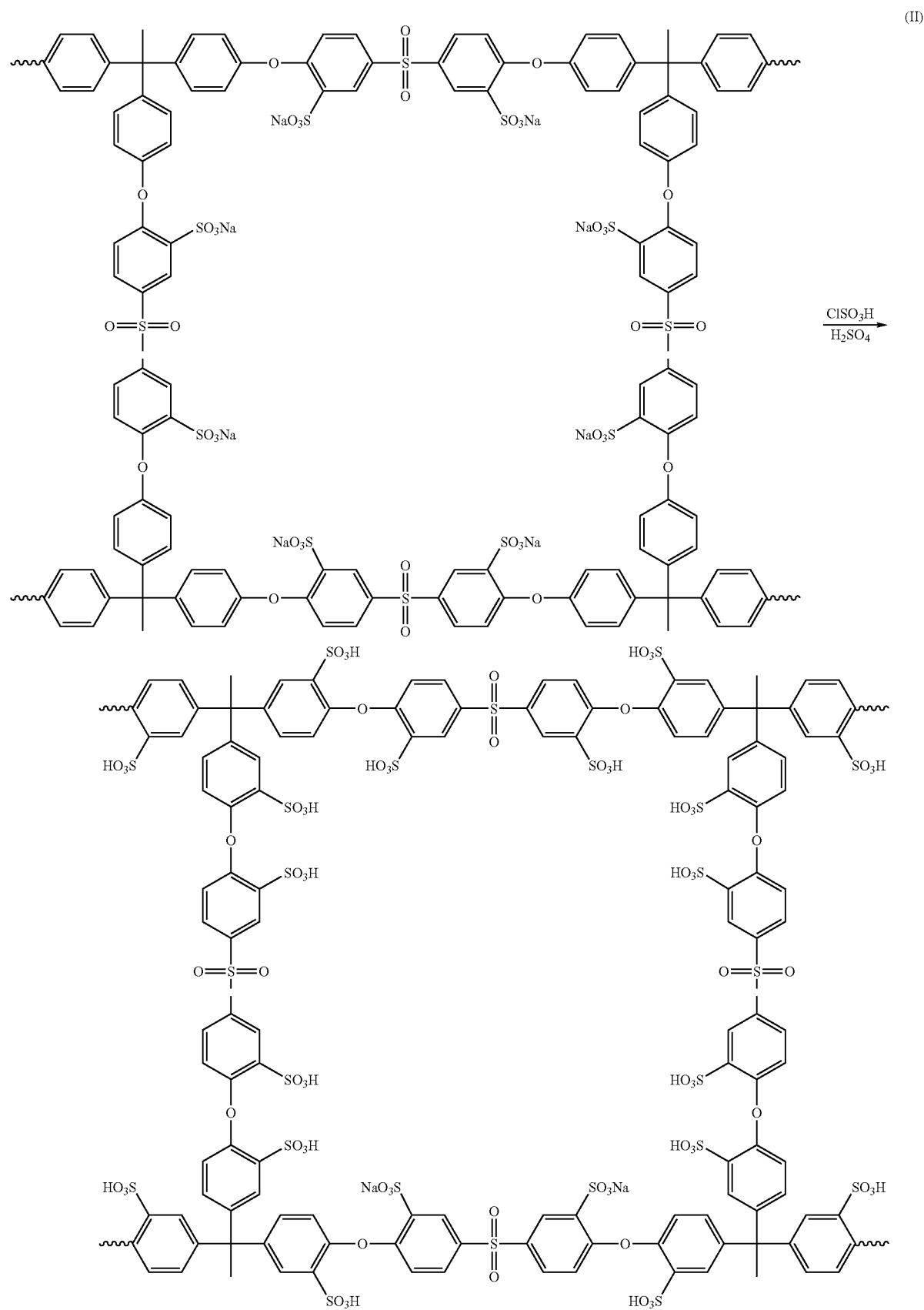

The post sulfonation increases the conductivity of the electrolyte membrane by an amount of 100 to about 1,000 percent over a comparative commercially available membrane such as NAFION 112® at a temperature of about 80° C. In one embodiment, the post sulfonation increases the conductivity of the electrolyte membrane by an amount of 200 to about 800 percent over a comparative commercially available membrane such as NAFION 112® at a temperature of about 80° C. In yet another embodiment, the post sulfonation increases the conductivity of the electrolyte membrane by an amount of 250 to about 600 percent over a comparative commercially available membrane such as NAFION 112® at a temperature of about 80° C.

The post sulfonation also increases the conductivity of the electrolyte membrane by an amount of 100 to about 2,000 percent over a comparative electrolyte membrane that contains polyethersulfone that has not been subjected to post sulfonation at a temperature of about 80° C. In one embodiment, the post sulfonation increases the conductivity of the electrolyte membrane by an amount of 200 to about 800 percent over a comparative electrolyte membrane that contains polyethersulfone that has not been subjected to post sulfonation at a temperature of about 80° C. In yet another embodiment, the post sulfonation increases the conductivity of the electrolyte membrane by an amount of 250 to about 600 percent over a comparative electrolyte membrane that contains polyethersulfone that has not been subjected to post sulfonation at a temperature of about 80° C.

The electrolyte membrane disclosed herein has a number of advantageous properties over comparative electrolytic membranes. When evaluated by thermogravimetric analysis (TGA) before acidification, the electrolyte membrane disclosed herein is stable to a temperature of up to about 563° C. After acidification, the disclosed electrolyte membrane, when evaluated by TGA, is stable to a temperature of up to about 285° C. In one embodiment, the electrolyte membrane, when evaluated by TGA analysis before acidification can be stable up to about 400° C., specifically up to about 500° C. and more specifically up to about 600° C. In an embodiment the electrolyte membrane, when evaluated by TGA analysis after acidification can be stable to up to about 200° C., specifically up to about 225° C. and more specifically up to about 250° C.

The disclosed electrolyte membrane also displays excellent dimensional stability. When the electrolyte membrane is immersed in water (at 25° C.) for about 24 hours, its area change rate before and after immersion can be less than or equal to about 20 percent, specifically less than or equal to about 10 percent, and more specifically less than or equal to about 3 percent. If the area change rate is less than or equal to about 20 percent, adhesion of the electrolyte membrane surface to a catalyst layer can be enhanced and interfacial resistance between the electrolyte membrane and the catalyst layer can be minimized.

An additional benefit to the use of an electrolyte membrane having a cross-linked structure is the introduction of a greater number of acid groups in the electrolyte membrane. In commercially available electrolyte membranes, the number of acid groups per polymer chain is limited due to water solubility and swelling in the presence of acid groups. However, as disclosed herein, when the electrolyte is cross-linked to form a network integrated with the porous substrate, the solubility level of the polyether sulfone can be decreased substantially.

The disclosed electrolyte membrane also displays chemical resistance. The disclosed electrolyte membrane can have a high oxidation resistance and is resistant to oxidizers, such as hydrogen peroxide that can be generated within the electrolyte membrane.

When the electrolyte membrane is immersed into a solution containing about 3 weight percent of hydrogen peroxide and about 5 parts per million of $FeSO_4$ at about 80° C. for about 1 hour, the weight change before and after the immersion can be less than or equal to about 10 percent, specifically less than or equal to about 5 percent, or less than or equal to about 2 percent. If the weight change is less than or equal to about 10 percent, an electrochemical cell which uses the disclosed electrolyte membrane can provide long-term stability.

The proton conductivity at about 80° C. and about 50% humidity can be equal to or greater than or equal to about 0.001 S/cm, specifically greater than or equal to about 0.01 S/cm, and more specifically greater than or equal to about 0.1 S/cm.

It is anticipated that sulfonic acids other than arylsulfonic acids can be incorporated into these polymers. For example, perfluorophenylsulfonic acids can be incorporated as pendant functionalities, or as part of the main polymer chain. Perfluoroalkylsulfonic acids could also be incorporated as pendant functionalities. The incorporation of more acidic functionalities would be expected to increase the proton conductivity of the polymers.

The electrolyte membrane thus obtained may be used in fuel cells, batteries, a fuel cell, a battery, a catalyst support or a catalyst. It can be used in water purification systems, as a polymeric catalyst or as a catalyst support if desired. In their basic forms (as sulfonate salts), these materials could serve as anion transport media, for transport of ions such as Na, Li, or the like.

The disclosure is further illustrated by the following non-limiting examples.

EXAMPLES

Example 1

This example was conducted to demonstrate the sulfonation of the proton conductor and the subsequent improvement in ionic conductivity. Tris(hydroxyphenyl)ethane (THPE) (2.75 g, 8.98 mmol) was added to a flask equipped with a condenser. To the flask, KOH (1.51 g, 27.0 mmol) and methanol (85 ml) were added. The mixture was heated at reflux for 40 minutes to promote the deprotonation reaction. After the removal of methanol, sulfonated difluorodiphenylsulfone SDFDPS (6.18 g, 13.5 mmol) was added to the flask. The mixture was dissolved in water (38 ml) and dimethylsulfoxide (3.4 ml). The dissolution was facilitated by heating the mixture at 80° C. for 10 minutes. Titanium tetraisopropoxide (0.383 g, 1.35 mmol) in IPA (39 ml) was added to the solution after cooling to room temperature. 0.75 g of 1% KOH solution was added at room temperature. The mixture was heated at 80° C. overnight. The solution was cast on both sides of ePTFE (QM702, BHA) supported on a plastic hoop. After drying the film at 150° C. for 1 h in $N_2$, the film was heated at 250° C. for 1 h in $N_2$.

The film was soaked in 0.9 M chlorosulfonic acid in 1,2-dichloroethane overnight under a nitrogen flow. The obtained film was rinsed with water and then soaked in 1.0 M $H_2SO_4$ solution overnight to convert the sodium salt to the sulfonic acid. After rinsing the film with deionized water and drying at room temperature, the electrolyte membranes were obtained. The ion exchange capacity increased from 2.0 to 3.6 after the post sulfonation.

Following a rinse of the film with deionized water and subsequent drying at room temperature, the proton conductivity of the film was measured using AC impedance. The thickness of the film was 45 μm. Conductivity measurements were performed at 60, 80, 100, and 120° C. at a relative humidity of 50, 75 and 100%. Nafion 112 film was provided as a comparison. Cross linked polyethersulfone without the sulfonation was used as a second comparative example. The results for the proton conductivity test at a controlled relative humidity of 50%, and at temperatures of 60, 80, 100, and 120° C., are shown in Table 1.

TABLE 1

| Temp [° C.] | % RH | Nafion 112 (Comparative Example 1) | | Crosslinked polyethersulfone (Comparative Example 2) | | Crosslinked polyethersulfone with post sulfonation (Example 1) | |
|---|---|---|---|---|---|---|---|
| | | Conductivity | Error | Conductivity | Error | Conductivity | Error |
| 60 | 50 | 0.0097 | 0.0018 | na | na | 0.0446 | 0.0034 |
| 80 | 50 | 0.0129 | 0.0021 | 0.0190 | 0.0026 | 0.0622 | 0.0039 |
| 100 | 50 | 0.0155 | 0.0024 | na | na | 0.0732 | 0.0043 |
| 120 | 50 | 0.0214 | 0.0027 | na | na | 0.0275 | 0.0030 |

As shown in Table 1, the proton conductivity of the material of Example 1, sulfonated cross-linked polyethersulfone is superior to Nafion 112 as well as the crosslinked polyether sulfone at 80° C.

Results for the proton conductivity of the film at a controlled temperature of 80° C. and at relative humidity levels of 25, 50, 75, and 100% are shown in Table 2.

TABLE 2

| Temp [° C.] | % RH | Nafion 112 (Comparative Example 1) | | Crosslinked polyethersulfone (Comparative Example 2) | | Crosslinked polyethersulfone with post sulfonation (Example 1) | |
|---|---|---|---|---|---|---|---|
| | | Conductivity | Error | Conductivity | Error | Conductivity | Error |
| 80 | 25 | 0.0031 | 0.0007 | 0.0008 | 0.0002 | 0.0346 | 0.0032 |
| 80 | 50 | 0.0129 | 0.0021 | 0.0190 | 0.0026 | 0.0622 | 0.0039 |
| 80 | 75 | 0.0430 | 0.0034 | 0.0821 | 0.0047 | 0.1989 | 0.0107 |
| 80 | 100 | 0.0763 | 0.0045 | 0.3928 | 0.0212 | 0.4169 | 0.0225 |

At each of the relative humidity levels tested, at a temperature of 80° C., the sulfonated cross-linked polyethersulfone demonstrates proton conductivity superior to Nafion 112 and to crosslinked polyethersulfone (without post sulfonation).

Example 2

This example was conducted to demonstrate the hydrolytic stability of the sulfonated proton conductor. The sulfonated crosslinked polyethersulfone film disclosed above in the example was subjected to 2 hours of immersion in water heated to 100° C. No leaching was observed after 2 hours in 100° C. water. The high cross-linking density prevents the leaching of the material. Dimensional stability of these films were also studied at room temperature. The dimensional stability of these films is shown in the Table 3.

TABLE 3

| | Uptake | Thickness change | X-axis change | Y-axis change |
|---|---|---|---|---|
| Crosslinked polyethersulfone | 83.8% | 40.9% | 11.8% | 27.3% |
| Std Deviation | 8.5% | 23.6% | 3.2% | 6.3% |
| Sulfonated crosslinked polyethersulfone | 84.6% | 67.9% | 28.5% | 8.4% |
| Std Deviation | 11.8% | 4.4% | 3.6% | 9.1% |

These numbers are comparable to linear polyethersulfone with ion-exchange capacity of 1.5. The results demonstrate that the high cross-linking density suppresses the water uptake and the dimensional changes while allowing high acid concentration in the membranes While this disclosure describes exemplary embodiments, it will be understood by those skilled in the art that various changes can be made and equivalents can be substituted for elements thereof without departing from the scope of the disclosed embodiments. In addition, many modifications can be made to adapt a particular situation or material to the teachings of this disclosure without departing from the essential scope thereof. Therefore, it is intended that this disclosure not be limited to the particular embodiment disclosed as the best mode contemplated for carrying out this disclosure.

What is claimed is:

1. A method of forming an electrolyte membrane comprising:
    forming a monomer mixture; the mixture comprising a polyhydroxy compound, an aromatic polyhalide compound and an alkali metal hydroxide;
    disposing the mixture on a porous substrate;
    reacting the mixture to form a crosslinked proton conductor; and
    sulfonating the proton conductor.

2. The method of claim 1, wherein the aromatic polyhalide compound is an aromatic sulfonated dihalide.

3. The method of claim 1, wherein the polyhydroxy compound is a compound having a structure shown in Formula (I):

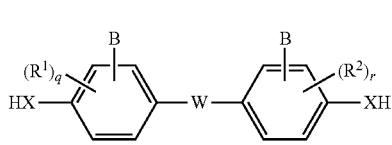
(I)

wherein B is a hydrogen, alkyl, aryl or a protonic acid containing group; the protonic acid group being a sulfonate group (—$SO_3H$), a carboxylate group (—COOH), a phosphate group (—$PO_3H_2$), an alkylsulfonate group —$(R^4)_nSO_3H$), a sulfamoylsulfonylalkyl group or a sulfamoylsulfonylaryl group (—$SO_2NHSO_2R$) where R is alkyl or aryl, a perfloruoalkylsulfonate group $(CF_2)_nSO_3H$), a sulfonylalkylsulfonate group $(SO_2(R^4)_nSO_3H)$, a sulfonylperfluoroalkylsulfonate group $(SO_2(CF_2)SO_3H)$, a sulfamoylsulfonylalkylsulfonate group $(SO_2NHSO_2(R^4)_nSO_3H)$, a sulfamoylsulfonylperfluoroalkylsulfonate group $(SO_2NHSO_2(CF_2)_nSO_3H)$, an alkylcarboxylate group (—$(R^4)_nCOOH$), a perfluoroalkylcarboxylate group $(CF_2)_nCO_2H$ an alkylphosphonate group (—$(R^4)_nPO_3H_2$), a perfluoroalkylphosphonate group or their conjugated salts; the conjugated salts having a metal cation; $R^1$ and $R^2$ are each independently a hydrogen atom, a halogen atom, a $C_{1-10}$ alkyl group, a halogen-substituted $C_{1-10}$ alkyl group, a $C_{6-50}$ aryl group; q and r are independently integers from 1 to about 4; $R^4$ is an alkyl, aryl or perfluoroalkyl group, X is O, S, or $SO_2$, and W is selected from the group consisting of

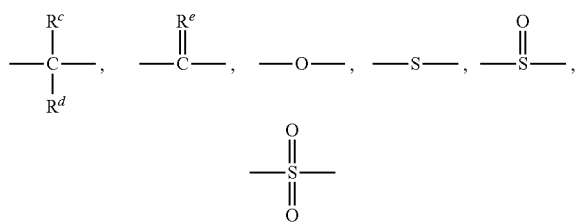

—$SO_2NHSO_2$—, —$SO_2(CF_2)_nSO_2$— and a benzoxazole having the formula below:

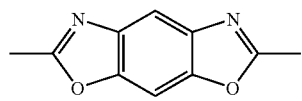

wherein $R^c$ and $R^d$ each independently represent a hydrogen atom or a monovalent linear or cyclic hydrocarbon group, and $R^e$ is a divalent hydrocarbon group, oxygen, or sulfur and wherein the benzoxazole is optionally substituted with at least one of a hydrogen atom, a halogen atom, a $C_{1-10}$ alkyl group, a halogen-substituted $C_{1-10}$ alkyl group, a $C_{6-50}$ aryl group, or a halogen-substituted $C_{6-50}$ aryl group and wherein n is from about 1 to about 10.

4. The method of claim 1, wherein the polyhydroxy compound has a structure shown in Formula (II) below:

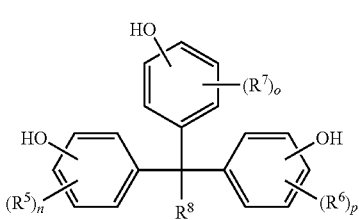
(II)

where $R^5$, $R^6$, $R^7$ and $R^8$ are each independently a hydrogen atom, a halogen atom, a $C_{1-10}$ alkyl group, a halogen-substituted $C_{1-10}$ alkyl group, a $C_{6-50}$ aryl group or a halogen-substituted $C_{6-50}$ aryl group, and n, o and p are each independently integers of 1 to about 4.

5. The method of claim 1, wherein the aromatic polyhalide compound has a structure shown in Formula (III):

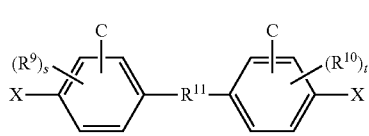
(III)

where X is a halogen, $R^9$ and $R^{10}$ are each independently a hydrogen atom, a halogen atom, a $C_{1-10}$ alkyl group, a halogen-substituted $C_{1-10}$ alkyl group, a $C_{6-10}$ aryl group, or a halogen-substituted $C_{6-10}$ aryl group, s and t are each independently integers of 1 to 4, $R^{11}$ represents one of the following groups

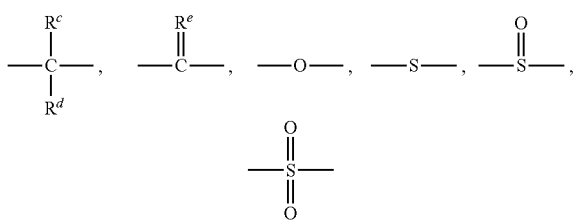

—$SO_2NHSO_2$—, —$SO_2(CF_2)_nSO_2$— or

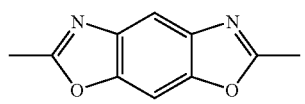

and C in Formula (III) is a protonic acid containing group; the protonic acid containing group being a sulfonate group (—$SO_3H$), a carboxylate group (—COOH), a phosphate group (—$PO_3H_2$), an alkylsulfonate group (—$(R^{12})_nSO_3H$), a sulfamoylsulfonylalkyl or sulfamoylsulfonylaryl group (—$SO_2NHSO_2R$), wherein R is alkyl or aryl), a perfloruoalkylsulfonate group $(CF_2)_nSO_3H$), a sulfonylalkylsulfonate group $(SO_2(R^{12})_nSO_3H)$, a sulfonylperfluoroalkylsulfonate group $(SO_2(CF_2)SO_3H)$, a sulfamoylsulfonylalkylsulfonate group $(SO_2NHSO_2(R^{12})_nSO_3H)$, a sulfamoylsulfonylperfluoroalkylsulfonate group $(SO_2NHSO_2(CF_2)_nSO_3H)$, an alkylcarboxylate group (—$(R^{12})_nCOOH$), a perfluoroalkylcarboxylate group $(CF_2)_nCO_2H$, an alkylphosphonate group (—$(R^{12})_nPO_3H_2$), an perfluoroalkylphoshonate group or their conjugated salts; the conjugated salts having a metal cation and wherein $R^{12}$ can be an alkyl, aryl or perfluoroalkyl group and n is from about 1 to about 10.

6. The method of claim 1, wherein the aromatic polyhalide compound has the structure shown in Formula (IV):

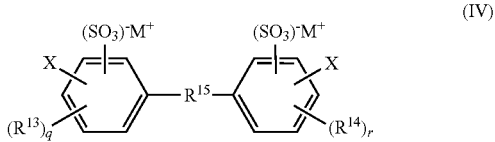

where X is a halogen and $R^{13}$ and $R^{14}$ are each independently a hydrogen atom, a halogen atom, a $C_{1-10}$ alkyl group, a halogen-substituted $C_{1-10}$ alkyl group, a $C_{6-10}$ aryl group, or a halogen-substituted $C_{6-10}$ aryl group; q and r are each independently integers of 1 to 3, $R^{15}$ represents one of the following groups:

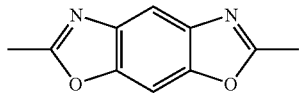

—SO2NHSO2—, —SO2(CF2)nSO2— or

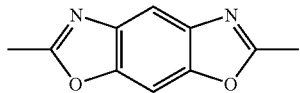

wherein $R^c$ and $R^d$ each independently represent a hydrogen atom or a monovalent linear or cyclic hydrocarbon group, and $R^e$ is a divalent hydrocarbon group, oxygen, or sulfur, q and r are each independently integers of 1 to 3, M represents a metal cation from Group I.

7. The method of claim 6, wherein $R^{13}$ and $R^{14}$ are each independently a hydrogen atom or a halogen atom, M is sodium, X is fluorine, and q and r are each independently integers of 1 to 3.

8. The method of claim 1, further comprising adding a first solvent to the mixture.

9. The method of claim 1, further comprising adding a second solvent to the mixture, wherein the second solvent is selected from the group consisting of an alcohol, water, liquid carbon dioxide, an aldehyde, a ketone, a nitrile, a sulfoxide, a sulfone, an ester, an amide, and a combination comprising at least one of the foregoing solvents.

10. The method of claim 9, wherein the second solvent is selected from the group consisting of isopropyl alcohol, dimethylsulfoxide, and a combination comprising at least one of the foregoing solvents.

11. The method of claim 1, wherein the porous substrate comprises an organic polymer selected from the group consisting of polyolefins, polyamides, polycarbonates, cellulosic polymers, polyurethanes, polyesters, polyethers, polyacrylates, copolyether esters, copolyether amides, chitosan, fluoropolymers, and a combination comprising at least one of the foregoing organic polymers.

12. The method of claim 1, wherein the porous substrate comprises a fluoropolymer selected from the group consisting of polytetrafluoroethylene, poly(vinylidene fluoride), poly(vinylidene fluoride-co-hexafluoropropylene), poly(tetrafluoroethylene oxide-co-difluoromethylene oxide, poly (tetrafluoroethylene-co-perfluoro(propylvinyl ether)), and a combination comprising at least one of the foregoing fluoropolymers.

13. The method of claim 12, wherein the fluoropolymer is expanded polytetrafluoroethylene.

14. The method of claim 1, further comprising reacting the mixture to form a proton conductor before disposing the mixture on the porous substrate.

15. The method of claim 1, wherein the mixture is disposed by extrusion, brushing, spraying, transfer coating, or a combination comprising at least one of the foregoing coating methods.

16. The method of claim 1, further comprising wherein the proton conductor is formed within and between the pores of the porous substrate to form a cross-linked proton-conducting network integrated with the porous substrate.

17. The method of claim 1, wherein the electrolyte membrane comprises about 0.5 weight percent to about 50 weight percent proton conductor, based on the total weight of the electrolyte membrane.

18. The method of claim 1, wherein the electrolyte membrane has a proton conductivity of greater than about 0.0001 Siemens per centimeter at about 80° C. and about 50 percent relative humidity.

19. A method comprising:
deprotonating a tris(hydroxyphenyl)ethane to produce a deprotonated tris(hydroxyphenyl)ethane;
reacting the deprotonated tris(hydroxyphenyl)ethane with sulfonated difluorodiphenylsulfone in the pores of a porous substrate to produce cross-linked polyethersulfone as shown in the reaction (I)

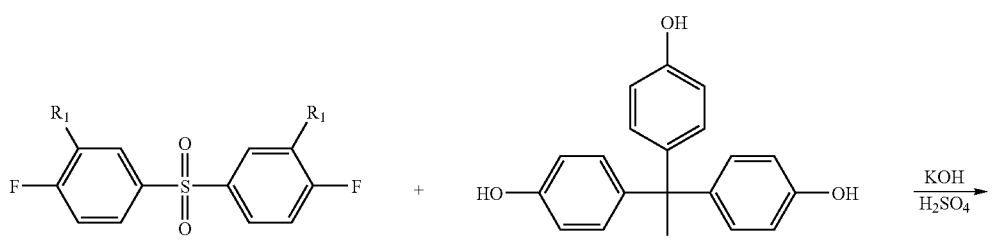

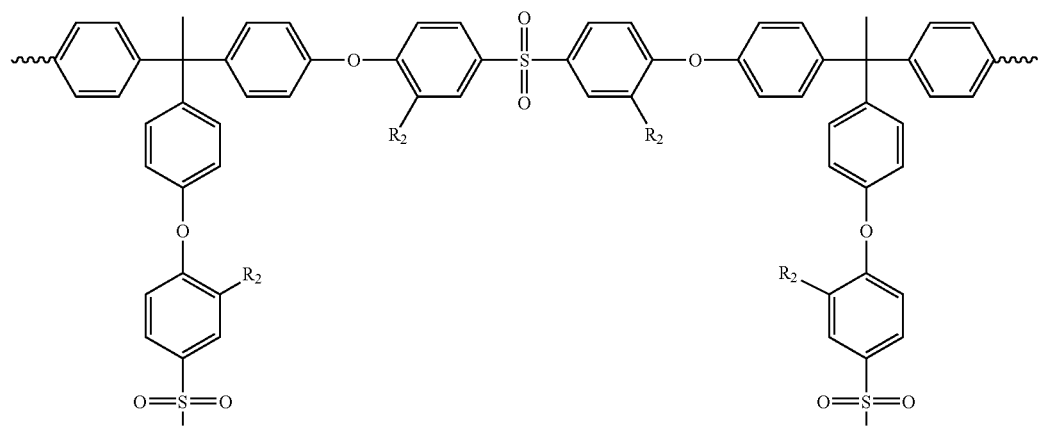
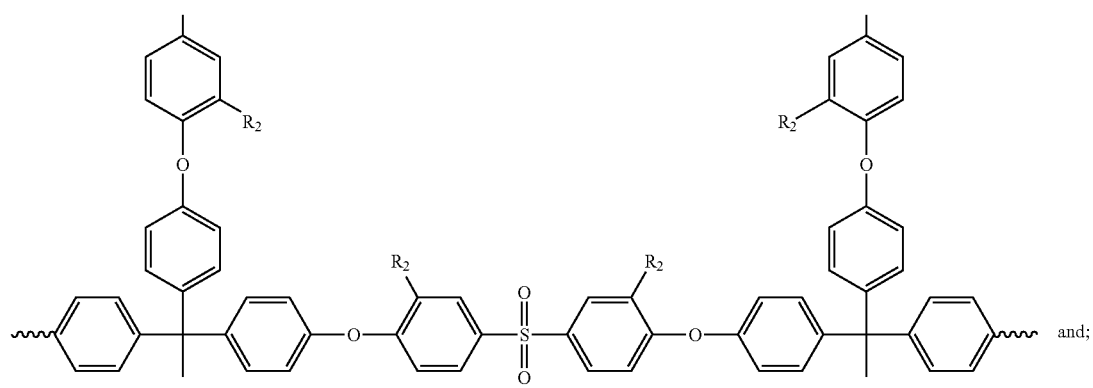 and;
sulfonating the crosslinked polyethersulfone as shown in the reaction (II)
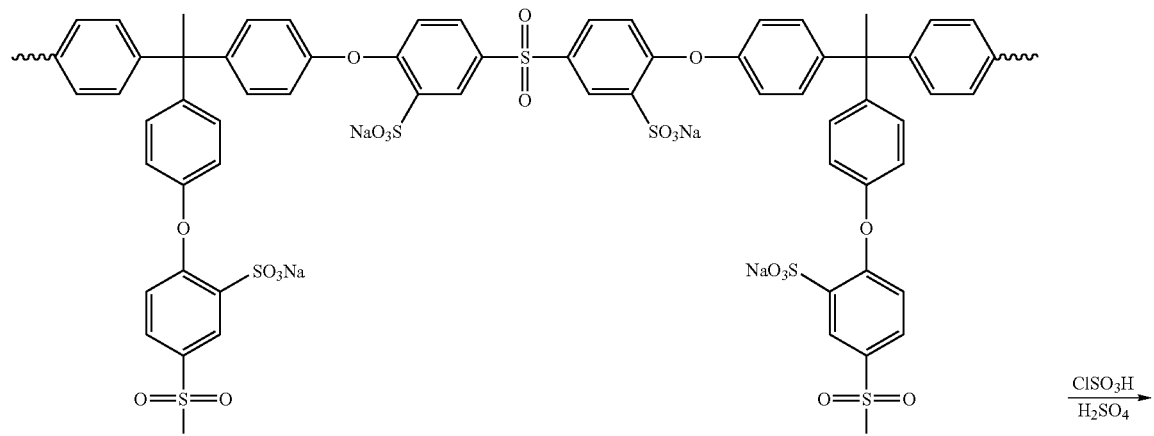

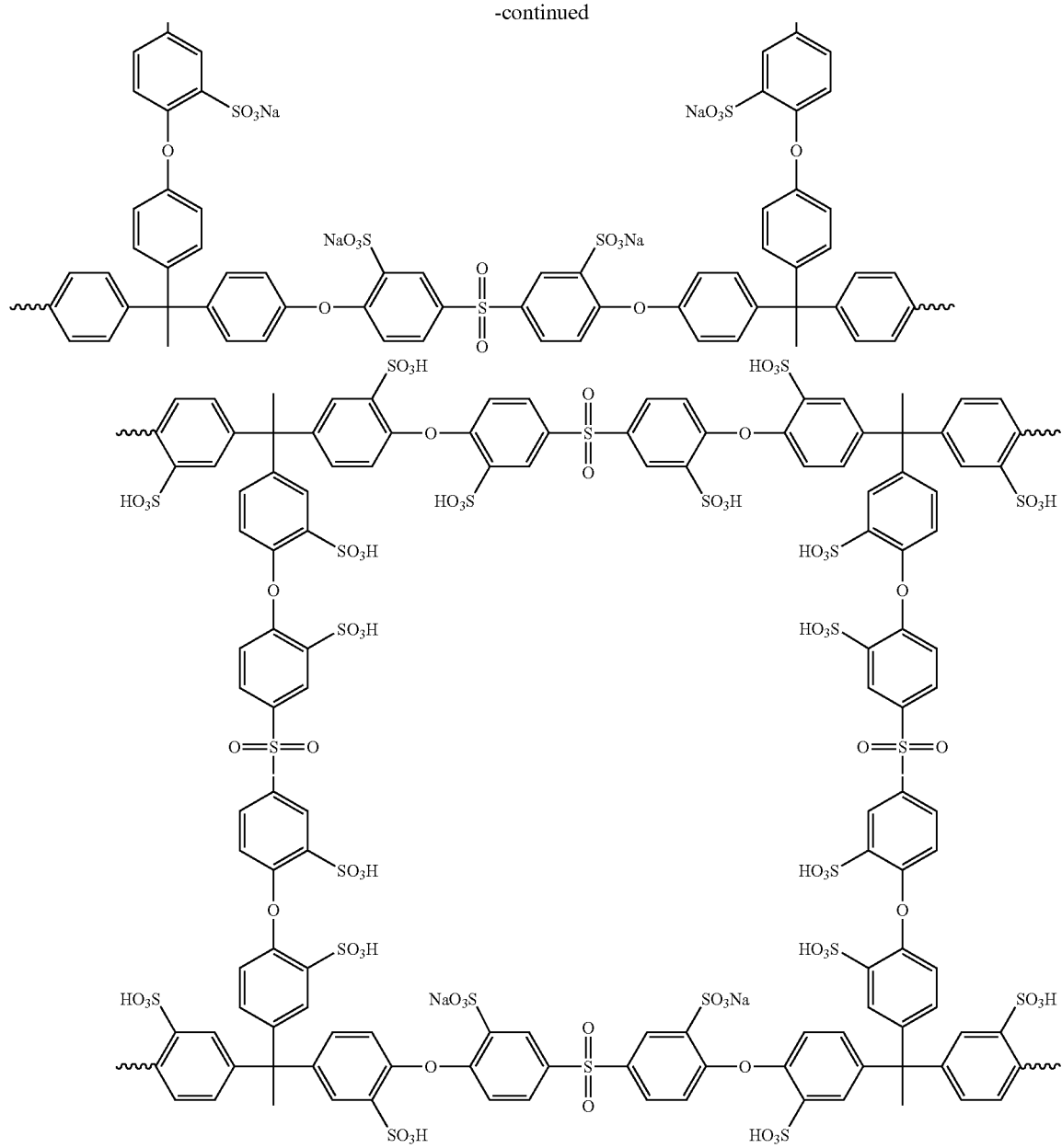

to produce a sulfonated crosslinked polyethersulfone in the pores of the porous substrate.

20. The method of claim 19, wherein the tris(hydroxyphenyl)ethane is deprotonated with an alkali metal hydroxide.

21. The method of claim 19, wherein the porous substrate comprises a fluoropolymer selected from the group consisting of polytetrafluoroethylene, poly(vinylidene fluoride), poly(vinylidene fluoride co-hexafluoropropylene), poly(tetrafluoroethylene oxide-co-difluoromethylene oxide, poly(tetrafluoroethylene-co-perfluoro(propylvinyl ether)), and a combination comprising at least one of the foregoing fluoropolymers.

22. A method of forming an electrolyte membrane comprising:

forming a first mixture, the mixture comprising a first solvent, an alkali metal hydroxide and a compound of formula (V):

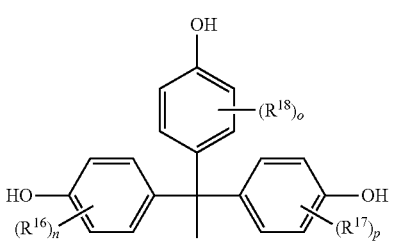

where $R^{16}$, $R^{17}$ and $R^{18}$ are each a hydrogen atom, a halogen atom, a $C_{1-10}$ alkyl group, a halogen-substituted $C_{1-10}$ alkyl group, a $C_{6-10}$ aryl group, or a halogen-substituted $C_{6-10}$ aryl group and n, o and p are each independently integers of 1 to about 4;

heating the first mixture;
adding to the first mixture a compound of formula (VI):

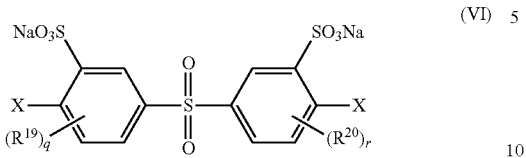

(VI)

where X is a halogen and $R^{19}$ and $R^{20}$ are each independently a hydrogen atom, a halogen atom, a $C_{1-10}$ alkyl group, a halogen-substituted $C_{1-10}$ alkyl group, a $C_{6-10}$ aryl group, or a halogen-substituted $C_{6-10}$ aryl group, and q and r are each independently integers of 1 to 3;
adding to the first mixture a second solvent to form a second mixture, wherein the second solvent comprises isopropanol and dimethylsulfoxide;
disposing the second mixture on a porous substrate, the porous substrate comprising expanded polytetrafluoroethylene;
reacting the second mixture to form a crosslinked proton conductor integrated with the porous substrate to form an electrolyte membrane; and
sulfonating the crosslinked proton conductor with a sulfonating agent for form a sulfonated crosslinked proton conductor.

\* \* \* \* \*